(12) United States Patent
Borg

(10) Patent No.: US 7,298,406 B2
(45) Date of Patent: Nov. 20, 2007

(54) GROUND REFERENCED PIXEL RESET

(75) Inventor: Matthew M. Borg, Albany, OR (US)

(73) Assignee: Micron Technology, Inc., Boise, ID (US)

( * ) Notice: Subject to any disclaimer, the term of this patent is extended or adjusted under 35 U.S.C. 154(b) by 714 days.

(21) Appl. No.: 10/051,739

(22) Filed: Jan. 16, 2002

(65) Prior Publication Data

US 2003/0133030 A1 Jul. 17, 2003

(51) Int. Cl.
*H04N 3/14* (2006.01)
*H04N 5/335* (2006.01)
*H04N 5/217* (2006.01)

(52) U.S. Cl. .................. 348/308; 250/208.1; 348/296

(58) Field of Classification Search ............... 348/302, 348/307–308, 310
See application file for complete search history.

(56) References Cited

U.S. PATENT DOCUMENTS

| 5,345,266 | A | | 9/1994 | Denyer |
| 5,471,515 | A | * | 11/1995 | Fossum et al. ............. 377/60 |
| 5,841,126 | A | | 11/1998 | Fossum et al. |
| 6,002,123 | A | * | 12/1999 | Suzuki ................... 250/208.1 |
| 6,133,862 | A | * | 10/2000 | Dhuse et al. ............... 341/118 |
| 6,147,846 | A | * | 11/2000 | Borg .......................... 361/91.1 |
| 6,380,880 | B1 | * | 4/2002 | Bidermann ................. 341/155 |
| 6,424,375 | B1 | * | 7/2002 | Fowler ....................... 348/241 |
| 6,469,740 | B1 | * | 10/2002 | Kuroda et al. .............. 348/308 |
| 6,476,372 | B2 | * | 11/2002 | Merrill et al. ........... 250/208.1 |
| 6,833,871 | B1 | * | 12/2004 | Merrill et al. .............. 348/302 |
| 6,861,635 | B1 | * | 3/2005 | Phan ....................... 250/208.1 |
| 2003/0076431 | A1 | * | 4/2003 | Krymski ..................... 348/308 |

OTHER PUBLICATIONS

Tartagni, Marco et al., A Fingerprint Sensor Based on the Feedback Capacitive Sensing Scheme, Jan. 1998, IEEE Journal of Solid-State Circuits, vol. 33, No. 1, pp. 139-140, figs. 13-14.*
Paul Horowitz et al., "The Art of Electronics," 2nd edition, Cambridge University Press, 1989, pp. 331-341.

* cited by examiner

*Primary Examiner*—Ngoc-Yen Vu
*Assistant Examiner*—Carramah J Quiett
(74) *Attorney, Agent, or Firm*—RatnerPrestia

(57) ABSTRACT

A ground referenced pixel reset circuit is disclosed. The ground referenced pixel reset circuit supplies a pixel with a reset signal such that when the reset signal is asserted high, the reset signal is at a ground referenced reset voltage independent from a supply voltage. The pixel includes a photosensor, such as a photodiode, that is coupled to a ground having a same potential as the ground of the reference voltage supply. In this manner, noise caused by fluctuations in the supply voltage is reduced.

6 Claims, 4 Drawing Sheets

GROUND REFERENCED PIXEL RESET

TECHNICAL FIELD

The present invention relates generally to a method and apparatus for digital image capture. In particular, the present method and apparatus provide for reduced row reset noise in image sensors, such as active pixel sensors.

BACKGROUND

Image sensor circuits are used in a variety of different types of digital image capture systems, including products such as scanners, copiers, digital cameras, and the like. The image sensor typically includes an array of light-sensitive pixels that are electrically responsive to incident light reflected from an object or scene whose image is to be captured.

The performance of an image capture system depends, at least in part, on the sensitivity of each individual pixel in the sensor array and its immunity from noise. Pixel sensitivity relates to the ratio of a change in the pixel output voltage to the photogenerated charge in the pixel. Noise may be defined as small fluctuations in a signal that can be caused by a variety of sources. Image sensors with increased noise immunity tend to yield sharper, more accurate images in the presence of environmental and other noise.

Improving the noise immunity of each pixel permits a reduction in exposure time, which in turn allows the capture of images at a greater rate. This may allow the image capture system to better capture motion in the scene. In addition to allowing greater frame rate, greater noise immunity may also help to resolve detail in images captured under low light conditions.

Integrated circuit imaging devices typically include an array of light detecting elements interconnected to generate analog signals representative of an image illuminating the device. Within such an integrated circuit, each image-sensing element contained in the integrated circuit usually contains a photosensor, such as a photodiode or phototransistor, as a light-detecting element. In one example, charge is collected or dissipated in accordance with the intensity of light illuminating the photosensor. By storing the resultant charge, an analog signal is thus generated having a magnitude approximately proportional to the intensity of light illuminating the light detecting element during an exposure interval.

During one common mode of operation, each pixel has a photo-sensitive diode, or photodiode, that is first reset by placing a charge across the photodiode. Then, the photodiode is exposed to incident light, which causes the charge stored on the photodiode to be dissipated in proportion to the intensity of the incident light. After a predetermined time period during which the photodiode is exposed to the incident light and charge is allowed to dissipate from the photodiode (i.e., the "integration" or "exposure" time), the charge at the node of the photodiode is read out. This value is the integrated voltage and may be sampled, such as onto a capacitor, by opening a switch or by other means.

After the charge at the node of the photodiode has been read-out, the photodiode is reset by asserting a reset signal to a reset transistor within the pixel. The amount of incident light that is detected by the photodiode is computed by subtracting the integrated voltage level from the reset voltage level.

Due to fluctuations in the power supply voltage, however, the reset level varies between resets. Thus, the noise present in the power supply affects the reset level. Because entire rows of photodiodes are typically reset at the same time, the noise generated tends to affect all the photodiodes in a row. This may result in each row having a different variation in noise that appears as row noise in an image. This noise may be manifest as row-wise coherent noise in an image captured by an array of pixels.

Additional background information is disclosed in U.S. Pat. Nos. 6,133,862, 5,841,126, 6,147,846, and 5,345,266, each of which is incorporated herein by reference.

SUMMARY

It is desirable to have a method and apparatus of using current pixel designs to achieve improved noise performance using electrical circuitry available with standard MOS fabrication and other suitable processes.

In accordance with one embodiment, a reset control circuit provides a reset signal that is independent from a supply voltage. A pixel reset line is coupled to a reference voltage source via a switch to provide a high level reset signal at the reference voltage. The reference voltage is referenced to a same ground as an anode of a photosensor, such as a photodiode, of the pixel and is independent of the supply voltage. The reference voltage may drive the reset line through an operational amplifier buffer.

An image capture system according to one embodiment includes a pixel having a photodetector coupled to a source terminal of a reset field effect transistor (FET). A gate terminal of the reset FET is coupled to a reset line for receiving a reset signal and the drain terminal of the reset FET is coupled to a supply voltage. A reference voltage source is provided and is coupled to the reset line via a switch to selectively provide the gate terminal of the reset FET with a reset signal at the reference voltage. The reference voltage is independent of the supply voltage. The reset FET may comprise an n-channel enhancement mode MOSFET.

According to another aspect of the present apparatus and method, an operational amplifier buffer is coupled along the reset line between the reference voltage source and the gate terminal of the reset FET.

Hence, pursuant to an aspect of the present apparatus and method, because the reset signal level is independent of the supply voltage, a difference signal generated by an associated column circuit is substantially independent of variations in the supply voltage. Since the reset signal level does not substantially change between resets, noise caused by differences in reset signal level between resets is reduced or eliminated.

In one embodiment, a first reset signal is initially provided to a pixel, the first reset signal being equal to a reference voltage. Next, a first voltage value generated at the pixel following a light exposure interval is read, the reference voltage being independent from the supply voltage. A second reset signal is then provided to the pixel, the second reset signal being equal to the reference voltage and a second voltage value is read from the pixel. Lastly, a pixel value is generated using the first and the second voltage values.

Additional details regarding the present apparatus and method may be understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

In the following detailed description, reference is made to the accompanying drawings, which form a part hereof, and in which are shown by way of illustration specific embodiments in which the invention may be practiced. It is to be understood that other embodiments may be utilized and structural changes may be made without departing from the scope of the present invention.

Figure 1:
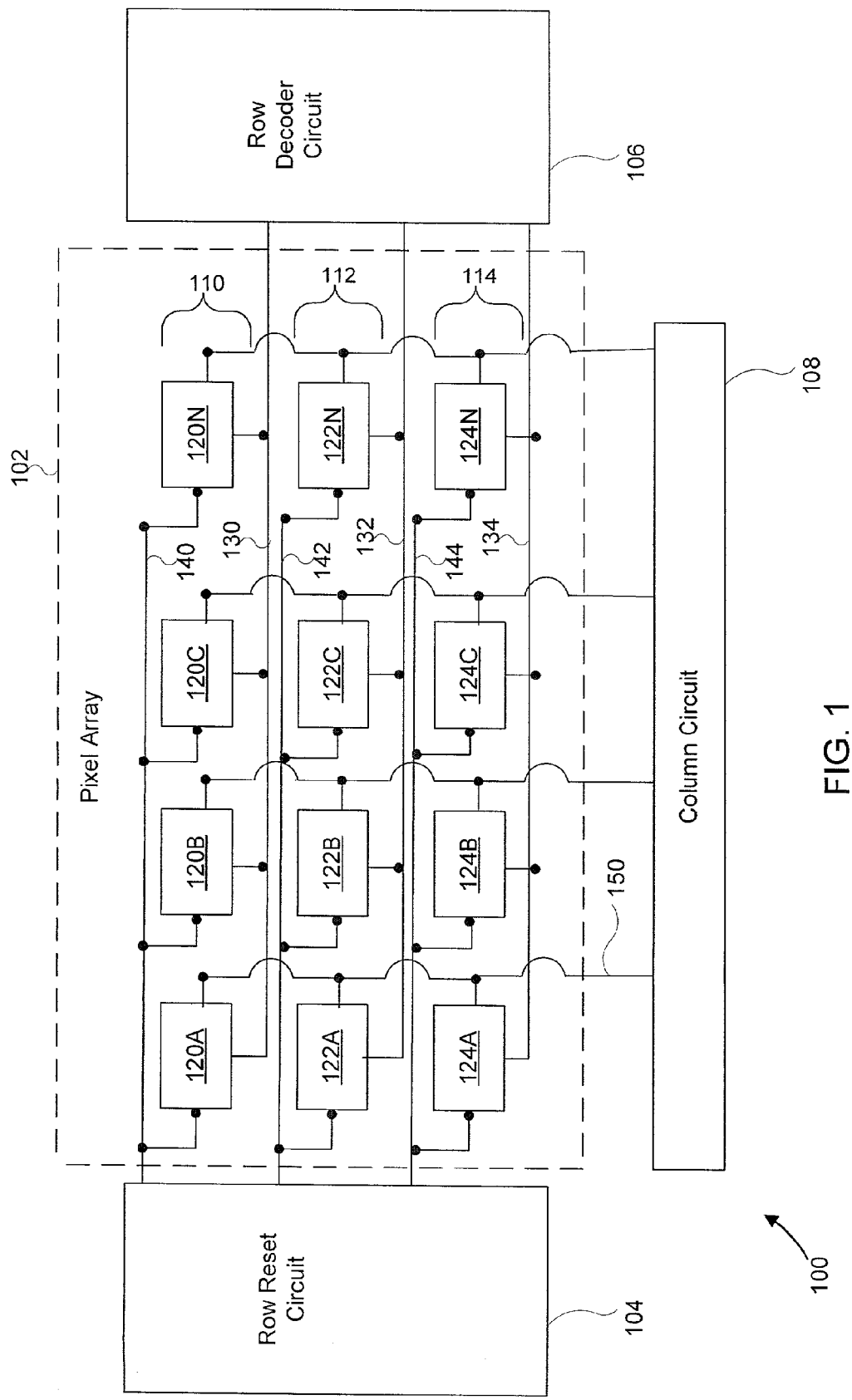
FIG. 1 is a block diagram of an image capture system in accordance with an embodiment of the present invention.

FIG. 1 illustrates an image capture system 100 in accordance with an embodiment of the present invention. The image capture system 100 includes a pixel array 102, a row reset circuit 104, a row decoder circuit 106, and a column circuit 108.

The column circuit 108 may comprise, for example, a column circuit similar to that disclosed in U.S. Pat. No. 5,471,515, which is incorporated herein by reference, or other suitable column circuit. The column circuit 108 may also be referred to as a "sample and hold" circuit. The row decoder circuit 106 provides row signals for selecting a row of pixels for readout and may comprise a row decoder circuit similar to those described in U.S. Pat. Nos. 6,133,862 and 5,841,126. The row reset circuit 104 and the row decoder circuit 106 may share decoding logic.

The pixel array 102 includes rows 110, 112, 114 of pixels 120, 122, 124, respectively. Row 110 includes pixels 120A, 120B, 120C, and 120N. Row 112 includes pixels 122A, 122B, 122C, and 122N. Row 114 includes pixels 124A, 124B, 124C, and 124N. The number of rows of pixels and the number of pixels in each row may vary and the rows 110, 112, 114 of pixels are merely illustrative of one example. The pixel array 102 may be configured in conformance with the VGA (Video Graphics Array) standard or other suitable standard.

As illustrated, pixels in a common row of pixels may share a common row line and a common reset line. For example, the pixels of row 110 share row line 130 and reset line 140. Likewise, the pixels of rows 112 and 114 share row lines 132, 142 and reset lines 134, 144, respectively. Further, each column of pixels within the pixel array 102 is connected to a common column line 150, which electrically connects the pixels of the associated column with the column circuit 108.

Figure 2:
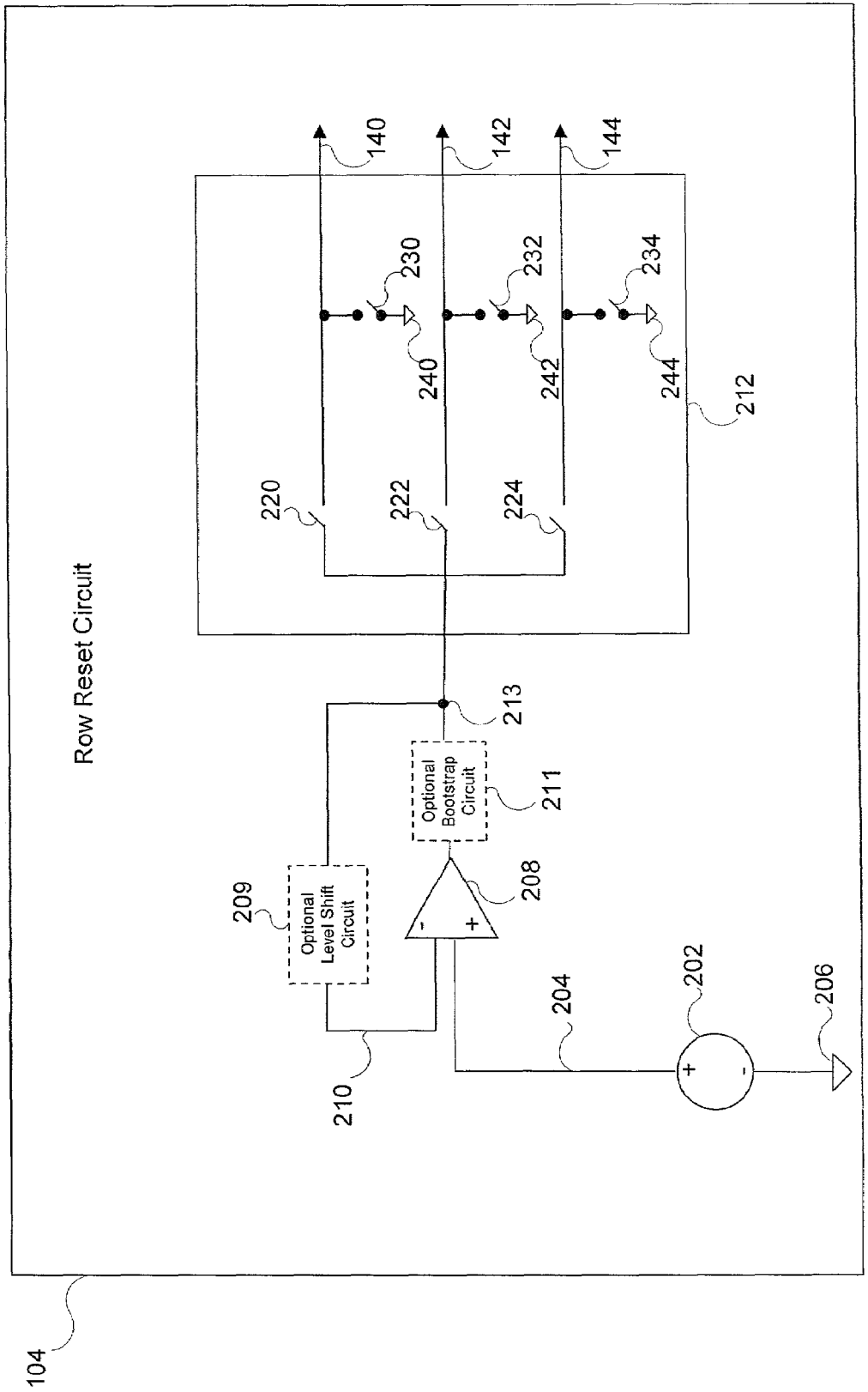
FIG. 2 illustrates details of the row reset circuit of the FIG. 1 image capture system in accordance with an embodiment of the present invention.

FIG. 2 illustrates details of the row reset circuit 104 of FIG. 1 in accordance with one embodiment of the present invention. As shown, the row reset circuit 104 includes a reference voltage source 202 that generates a reference voltage on a reference voltage line 204. The reference voltage is referenced from a ground 206.

An operational amplifier 208 is disposed along the reference voltage line 204. The operational amplifier 208 receives the reference voltage via the reference line 204 at one input and the operational amplifier output voltage via a feedback line 210 at the other input. In this configuration, the operational amplifier 208 serves as a non-inverting unity gain amplifier and a reference voltage buffer.

A switching device 212 receives the output voltage of the operational amplifier 208. The switching device 212 selectively supplies the reference voltage to the reset lines 140, 142, 144 and connects the reset lines not being supplied with the reference voltage to ground. In one embodiment, the switching device 212 comprises a multiplexer, although other switching devices and switching configurations may be employed.

As shown, the switching device 212 includes switches 220 and 230 associated with line 140. The switches 220 and 230 operate opposite each other so that when the switch 220 is in an open position, the switch 230 is closed and connects the reset line 140 to ground 240. When the switch 220 is in a closed position, the switch 230 is opened such that the reset line 140 is supplied with the reference voltage, as amplified by the operational amplifier 208.

Similarly, the switches 222 and 232 operate opposite each other so that when the switch 222 is in an open position, the switch 232 is closed and connects the reset line 142 to ground 242. When the switch 222 is in a closed position, the switch 232 is opened such that the reset line 142 is supplied with the reference voltage, as amplified by the operational amplifier 208.

Likewise, the switches 224 and 234 operate opposite each other so that when the switch 220 is in an open position, the switch 234 is closed and connects the reset line 144 to ground 244. When the switch 224 is in a closed position, the switch 234 is opened such that the reset line 144 is supplied with the reference voltage, as amplified by the operational amplifier 208.

Further, since the switching device 212 typically supplies the reference voltage to only one of the reset lines 140, 142, 144 at any given time, when the switch 220 closes, the switches 232, 234 are closed and the switches 230, 222, and 224 are open. Similarly, when the switch 222 closes, the switches 230 and 234 are closed and the switches 220, 224, and 232 are open. Likewise, when the switch 224 closes, the switches 230 and 232 are closed and the switches 220, 222, and 234 are open.

The switches of FIG. 2 are all illustrated in open positions for convenience of illustration.

The switching device 212 is one example mechanism for supplying the reference voltage to the various reset lines 140, 142, and 144. Other mechanisms may alternatively be employed. For example, a separate reference voltage source (not shown) may alternatively be provided for each of the reset lines 140, 142, and 144.

As shown in dashed lines, the row reset circuit 104 may optionally include a level shift circuit 209 and a bootstrap circuit 211 for implementations where the generated reset voltage at node 213 is bootstrapped to a level greater than or equal to the supply voltage $V_{dd}$. The level shift circuit 209 may be implemented as a source follower or as a capacitive divider to shift the bootstrap voltage down to equal the reference voltage. The bootstrap circuit 211 boosts the reset voltage at 213 above the reference voltage and may be implemented, for example, as a switched capacitor circuit.

Figure 3:
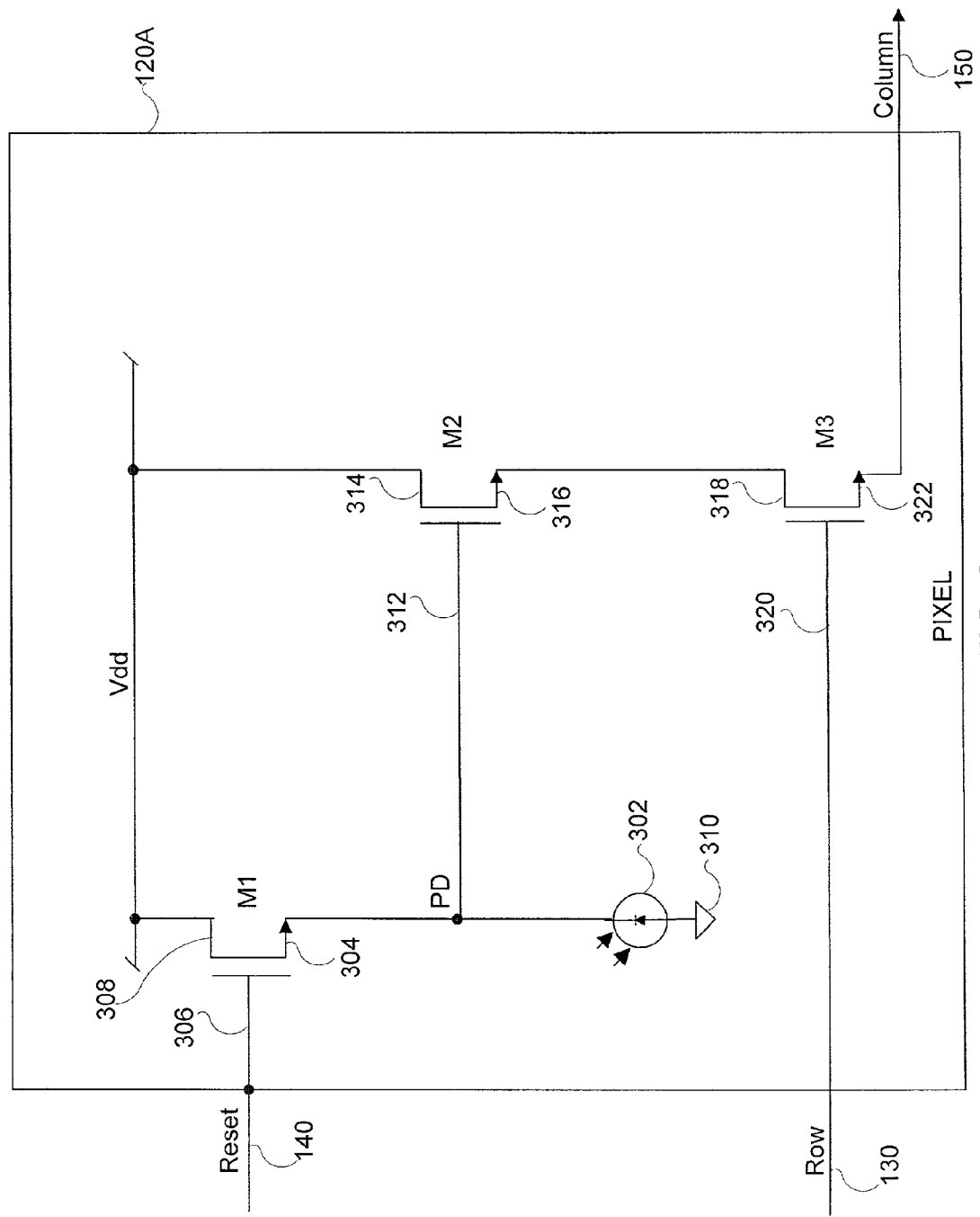
FIG. 3 illustrates details of one possible FIG. 1 pixel.

FIG. 3 illustrates details of one embodiment of the pixel 120A of FIG. 1. As shown, the pixel 120A includes photosensor, such as a photodiode 302, coupled to a source terminal 304 of a reset field effect transistor (FET) M1. The reset FET M1 comprises an n-channel enhanced mode MOSFET. A gate terminal 306 of the reset FET M1 is coupled to the reset line 140 (see, FIGS. 1 and 2) and a drain terminal 308 of the reset FET M1 is coupled to a supply voltage $V_{dd}$. The cathode of the photodiode 302 is coupled to the source terminal 304 of the reset FET M1 at a node PD and the anode of the photodiode 302 is coupled to a ground 310. The ground 310 and the ground 206 (FIG. 2) are tightly coupled at a same potential. The grounds 240, 242, and 244 (FIG. 2) may optionally also be at or near the same potential as the grounds 310 and 206.

The supply voltage $V_{dd}$ may be greater or less than the reset voltage, as received at the gate terminal 306 of the reset FET M1. Setting the reset voltage to be greater than the supply voltage $V_{dd}$ by use of, for example, a bootstrap circuit may, however, provide a more dynamic range, which may be beneficial in some applications.

A gate terminal 312 of a second FET M2 is coupled to the node PD. A drain terminal 314 of the FET M2 is coupled to the supply voltage Vdd and a source terminal 316 of the FET M2 is coupled to a drain terminal 318 of a third FET M3. A gate terminal 320 of the FET M3 is coupled to the row line 130. A source terminal 322 of the FET M3 is coupled to the column line 150. The FETs M2 and M3 comprise n-channel enhancement mode MOSFETs.

The other pixels of the pixel array 102 may be configured identically to the pixel 120A. Other suitable pixel designs may alternatively be employed.

Figure 4:
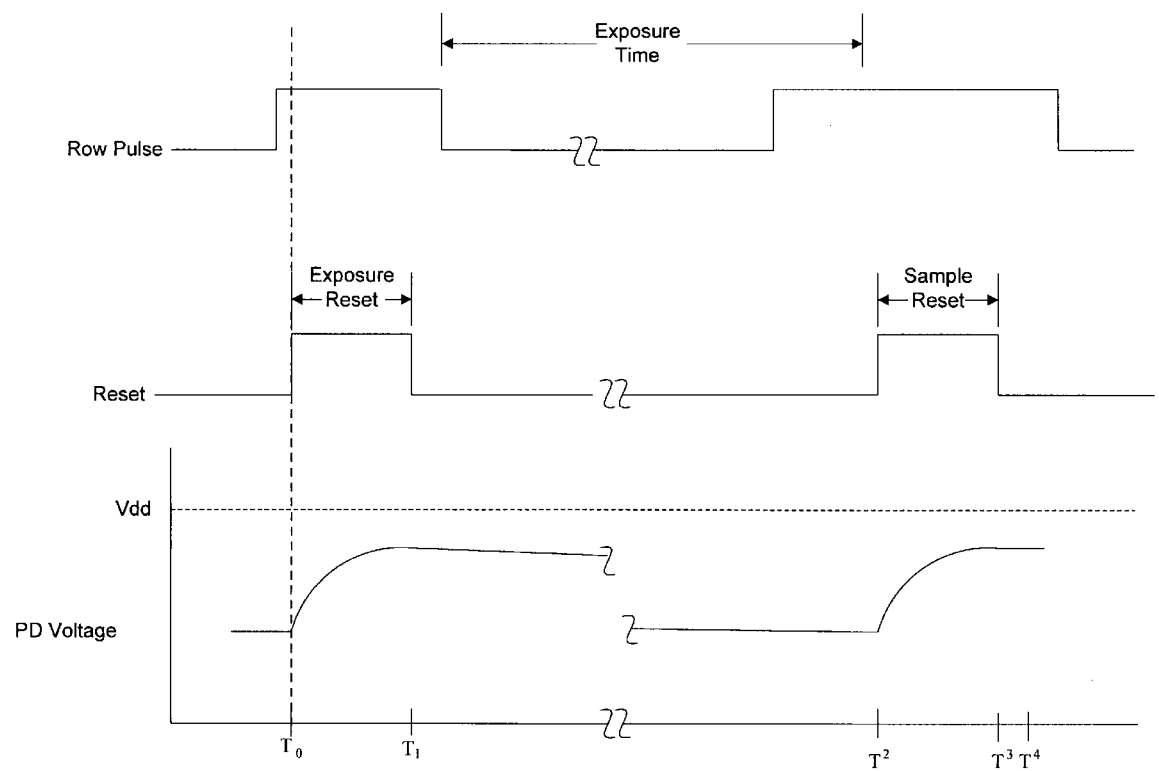
FIG. 4 illustrates a timing diagram and associated PD node voltage in accordance with an embodiment of the present invention.

Operation of the image capture system 100 (FIG. 1) will now be described with reference to FIG. 4. At time $T_0$, the exposure reset interval for a row 110 of pixels begins with the row reset circuit 104 (FIGS. 1 and 2) supplying the reset line 140 with the ground referenced reset voltage. The reset line 140 (FIG. 1) supplies the ground referenced reset voltage to the gate terminal 306 (FIG. 3) of the reset FET M1, which causes the reset FET M1 to open. With the reset FET M1 open, the voltage at node PD (FIG. 2) rises approximately to the ground referenced reset voltage minus the threshold voltage of the reset FET M1.

Once the voltage at node PD reaches the ground referenced reset voltage minus the threshold voltage of the reset FET M1, the reset line is pulled low (switch 230 is closed). The node PD at this point is said to be "floating." Next, at time $T_1$ exposing the photodiode 302 (FIG. 3) to light causes charge to be collected by the photodiode 302 and the voltage at node PD begins to drop, or decrease, during the exposure time.

In some embodiments, the duration between $T_0$ and $T_1$ is in the range of about 0.5-4 microseconds. An optional row pulse may begin and end just before and just after the beginning and end of the exposure reset time, respectively, for glitch cancellation purposes.

At the end of the exposure time, the row signal is asserted high and the integrated signal is sampled by the column circuit 108. In particular, the row line 130 is asserted high by the row decoder circuit 106 (FIG. 1) and turns on the FET M3.

FET M2 then drives the column line 150 with a level-shifted version of the voltage at node PD. As discussed below, column circuit 108 (FIG. 1) uses the level-shifted version of the voltage at node PD in determining the magnitude of the integrated signal. The integrated signal is approximately proportional to the incident light to which the photodiode 302 (FIG. 3) was exposed during the exposure time.

The voltage at node PD at time $T_2$ is approximately equal to the ground referenced reset voltage at $T_1$ minus the integrated signal minus the threshold voltage of the reset FET M1. The threshold voltage of the reset FET M1 may be considered to be the same from reset to reset. The exposure time, or exposure interval, typically has a duration in the range of about 1-60 milliseconds, but may be of much longer or shorter duration.

The sample reset interval begins at time T2 with the row reset circuit 104 (FIGS. 1 and 2) supplying the ground referenced reset voltage to the gate terminal 306 of the reset FET M1, causing the reset FET M1 to turn on. With the reset FET M1 on, the voltage at node PD increases to the ground referenced reset voltage at time T3 minus the threshold voltage of the reset FET M1. The sample reset interval extends from time T2 to time T3 and may have a duration substantially equal to that of the exposure reset time. At time T3, the reset voltage is pulled to ground.

At time $T_4$, the column circuit 108 samples the voltage of node PD shortly after time $T_3$.

The column circuit 108 may then generate a difference signal equal to the pixel reset level minus the integrated signal level where the pixel reset level is the sample taken at $T_4$ and the integrated signal level is the sample taken at the end of the exposure time $T_2$. Thus, the difference signal includes the signal that is proportional to the incident light plus an error term. The error term is equal to the difference in the ground referenced reset voltage during the first and second reset intervals (i.e., the exposure reset interval and the sample reset interval). Since the generated ground referenced reset voltage is the same during both the first and second reset intervals (i.e., at both $T_2$ and $T_4$), the error term is zero (or a negligible value) and the difference signal is equal to the integrated signal and is independent from the supply voltage.

The above-described embodiments of the present invention are meant to be merely illustrative and not limiting. Thus, those skilled in the art will appreciate that various changes and modifications may be made without departing from this invention in its broader aspects. Therefore, the appended claims encompass all such changes and modifications as fall within the scope of this invention.

What is claimed is:

1. An image capture system, comprising:
   a plurality of rows of pixels, each row comprising:
   a reset line for providing a reset signal;
   a plurality of pixels, each pixel comprising:
   a first FET having a gate terminal coupled to a reset line, a drain terminal coupled to a supply voltage, and a source terminal coupled to a readout node; and
   a photodetector coupled between a first ground and the readout node;
   a switching device selectively coupled to one of reset lines in the rows of pixels;
   reference voltage source coupled between a second ground and one of the reset lines via the switching device, wherein the reference voltage source generates a reset voltage that is independent of the supply voltage and the first and second grounds have the same potential; and
   an operational amplifier buffer comprising (1) an output coupled by the switching device to one of the reset lines, (2) a non-inverting input coupled to the reference voltage source to receive the reset voltage, and (3) an inverting input coupled to the output in a feedback loop, wherein the feedback loop does not pass through the readout node.

2. The image capture system of claim 1, wherein the first FET further comprises an n-channel enhancement mode MOSFET.

3. The image capture system of claim 1, wherein the ground referenced reset voltage is greater than the supply voltage.

4. The image capture system of claim 1, further comprising a second FET having a gate terminal coupled to the readout node and a drain terminal coupled to the supply voltage.

5. The image capture system of claim 4, further comprising a third FET having a gate terminal coupled to a row select line, a source terminal coupled to a column line, and a drain terminal coupled to a source terminal of the second FET.

6. The image capture system of claim 5, wherein the switching device comprises a multiplexer.

* * * * *

UNITED STATES PATENT AND TRADEMARK OFFICE
CERTIFICATE OF CORRECTION

| | | |
|---|---|---|
| PATENT NO. | : 7,298,406 B2 | Page 1 of 1 |
| APPLICATION NO. | : 10/051739 | |
| DATED | : November 20, 2007 | |
| INVENTOR(S) | : Borg | |

It is certified that error appears in the above-identified patent and that said Letters Patent is hereby corrected as shown below:

In column 6, line 47, in Claim 1, after "coupled to" delete "a" and insert -- the --, therefor.

In column 6, line 55, in Claim 1, before "reference" insert -- a --.

Signed and Sealed this

Twenty-ninth Day of April, 2008

JON W. DUDAS
*Director of the United States Patent and Trademark Office*